United States Patent
Seol et al.

(10) Patent No.: US 7,105,145 B2
(45) Date of Patent: Sep. 12, 2006

(54) METHOD OF PRODUCING FERROELECTRIC METAL OXIDE CRYSTALLINE PARTICLES

(75) Inventors: Kwang-Soo Seol, Wako (JP); Kazuo Takeuchi, Wako (JP); Takeshi Miyagawa, Wako (JP); Yoshimichi Ohki, Wako (JP)

(73) Assignee: RIKEN, Wako (JP)

( * ) Notice: Subject to any disclaimer, the term of this patent is extended or adjusted under 35 U.S.C. 154(b) by 571 days.

(21) Appl. No.: 10/283,193

(22) Filed: Oct. 30, 2002

(65) Prior Publication Data

US 2004/0086452 A1    May 6, 2004

(30) Foreign Application Priority Data

Oct. 30, 2001   (JP) ............................ 2001-332838

(51) Int. Cl.
*C04B 35/468* (2006.01)
*C04B 35/47* (2006.01)
*C04B 35/472* (2006.01)
*C04B 35/475* (2006.01)
*C04B 35/491* (2006.01)
*C04B 35/495* (2006.01)
*C01G 23/04* (2006.01)
*C01G 29/00* (2006.01)

(52) U.S. Cl. ............... 423/598; 423/594.7; 423/594.8; 501/135; 501/136; 501/137

(58) Field of Classification Search ............... 423/598, 423/594.7–594.14, 594.16; 501/134, 135–137
See application file for complete search history.

(56) References Cited

U.S. PATENT DOCUMENTS 5,032,375 A    7/1991    Lerot et al.

5,358,695 A *  10/1994   Helble et al. ............... 423/263

FOREIGN PATENT DOCUMENTS

| DE | 197 44 857 A1 | 5/1999 |
|---|---|---|
| JP | 9-502920 A | 3/1997 |
| JP | 2000-24493 A | 1/2000 |
| WO | WO 95/03907 A1 | 2/1995 |

OTHER PUBLICATIONS

J. G. Marx et al.; ISAF ,94. Proceedings of the Ninth IEEE International Symposium on Applications of Ferroelectrics; pp. 130-133; Aug. 7-10, 1994.*

Nichols et al.: "Large Scale production of nanocrystals by laser ablation of microparticles in flowing sol," Appl. Phys. Lett. 78 1128, Feb. 19, 2001.

Koshiazaki et al.: "Size distribution and growth mechanism of $Co_3O_4$ nanoparticles fabricated by pulsed laser deposition," Scr. Mat. 44 1925, May 18, 2001.

(Continued)

*Primary Examiner*—Stuart L. Hendrickson
*Assistant Examiner*—Alvin T Raetzsch
(74) *Attorney, Agent, or Firm*—Birch, Stewart, Kolasch & Birch, LLP (57) ABSTRACT

Ferroelectric metal oxide crystalline particles are produced by first producing nanoparticles of a ferroelectric metal oxide and dispersing the nanoparticles in a gas phase. Then, the nanoparticles are processed by heat treatment with the nanoparticles being maintained in the gas phase in a dispersed state. The nanoparticles may be produced by using a laser ablation method. The ferroelectric metal oxide may have a perovskite crystal structure.

13 Claims, 7 Drawing Sheets

OTHER PUBLICATIONS

Wu et al.: "Preparation of bismuth titanate thin films by laser ablation," Jpn. J. Appl. Phys. 34 5141 Sep. 1995.

Frantti et al.: "Characterisation of $Pb_{0.97}Nd_{0.02}(Zr_{0.55}Ti_{0.45})O_3$ thin films prepared by pulsed laser ablation," J. Appl. Phys. 76 2139, Aug. 15, 1994.

* cited by examiner

METHOD OF PRODUCING FERROELECTRIC METAL OXIDE CRYSTALLINE PARTICLES

BACKGROUND OF THE INVENTION

1. Field of the Invention

The present invention relates to a method of producing ferroelectric metal oxide crystalline particles of particle sizes on the order of nanometers (hereinafter referred to as "nanoparticles") and, more particularly, to a method capable of producing high-purity, high-crystallinity ferroelectric metal oxide crystalline particles.

2. Description of the Related Art

Spontaneous polarization of a ferroelectric material has two thermodynamically stable states of opposite directions of polarization. The direction of polarization of the ferroelectric material can be changed by applying an external electric field to the ferroelectric material.

Full-scale practical application of nonvolatile memories utilizing the foregoing distinctive features of ferroelectric materials has been growing in recent years. Development of new recording mediums using ferroelectric materials have made progress in recent years. Those nonvolatile memories and new recording mediums realize high-density recording by inverting the polarization of minute regions of the ferroelectric material with an atomic force microscope or the like. A ferroelectric metal oxide having a layered structure (perovskite structure) of bismuth oxide as a crystal structure, such as $SrBi_2Ta_2O_9$ (abbreviated to "SBT"), is the most suitable ferroelectric material for fabricating the nonvolatile memories and the new recording mediums.

There has been growing request for increasing the number of components per nonvolatile memory or recording medium, and miniaturization of nonvolatile memories and recording mediums in recent years. High-purity, high-crystallinity fine crystal grains of a ferroelectric metal oxide of particle sizes not greater than 50 nm are necessary to fabricate high-capacity memories having a high storage capacity not lower than 100 gigabit/$in^2$.

A generally used conventional method of producing such fine crystal grains of a high-purity, high-crystallinity ferroelectric metal oxide deposits an amorphous precursor thin film on a silicon wafer by a sol-gel method or a CVD method, and subjects the precursor thin film to a heat treatment to crystallize the precursor thin film.

This conventional method needs to process the thin film of the ferroelectric metal oxide by the heat treatment, and hence has difficulty in simultaneously controlling both the size and the crystallinity of the fine crystal grains of the ferroelectric metal oxide. Although fine crystal grains on the order of nanometers can be produced when a ferroelectric metal oxide is heat-treated at a low temperature, a large amount of impurities remain in the ferroelectric metal oxide; and the crystallinity is reduced because the temperature for the heat treatment is low. The nanoparticles of the ferroelectric metal oxide thus produced are not suitable for use as a ferroelectric material for forming nonvolatile memories and new recording mediums. On the other hand, although high-purity, high-crystallinity fine crystal grains of a ferroelectric metal oxide can be produced when the ferroelectric metal oxide is heat-treated at a high temperature, crystals grow excessively and it is difficult to produce fine crystal grains on the order of nanometers.

SUMMARY OF THE INVENTION

The present invention has been made in view of the foregoing problems and it is therefore an object of the present invention to provide a method capable of easily producing high-purity, high-crystallinity nanoparticles of a ferroelectric metal oxide.

According to one aspect of the present invention, a method of producing ferroelectric metal oxide crystalline particles includes: a first step of producing nanoparticles of a ferroelectric metal oxide and dispersing the nanoparticles in a gas phase; and a second step of processing the nanoparticles by a heat treatment with the nanoparticles being maintained in the gas phase in a dispersed state.

In the method according to the present invention, it is preferable that in the first step the nanoparticles are produced by a laser ablation method. Also, it is preferable that in the first step the nanoparticles are produced by a method selected from a group consisting of a sputtering method, a CVD method, a coprecipitation method and an electrospraying method.

Further, in the method according to the present invention, it is preferable that the nanoparticles produced in the first step comprise a ferroelectric metal oxide that takes a perovskite structure as a crystal structure. Preferably, the ferroelectric metal oxide may be selected from a group of $PbTiO_3$, $BaTiO_3$ and $Pb(Zr_{1-x}Ti_x)O_3$. Also, the ferroelectric metal oxide may be selected from a group of $SrBi_2Ta_2O_9$, $Bi_4Ti_3O_{12}$ and $SrBi_2Nb_2O_9$. It is preferable that the particle sizes of the nanoparticles produced in the first step are in the range of 1 to 100 nm.

Furthermore, it is preferable that in the second step the conditions for the heat treatment is changed so as to control a particle size, crystal form and crystallinity of the nanoparticles of the ferroelectric metal oxide to be produced. Preferably, the gas phase used in the first and second steps may be an atmosphere of oxygen gas, or an atmosphere of a mixed gas of oxygen and other gases.

In the method according to the present invention, nanoparticles of a ferroelectric metal oxide are produced and dispersed in a gas phase; and the nanoparticles are processed by the heat treatment with the nanoparticles being maintained in the gas phase in the dispersed state. Therefore, the growth of the nanoparticles during the heat treatment can be inhibited even if the heat treatment uses high-temperature heat. Consequently, high-purity, high-crystallinity nanoparticles of a ferroelectric metal oxide can be easily produced.

The method according to the present invention is able to easily control the particle sizes of the end nanoparticles of the ferroelectric metal oxide by selectively using a proper particle producing method and properly adjusting particle producing conditions. It is also able to easily control the particle size, crystal form and crystallinity of the end nanoparticles of the ferroelectric metal oxide by properly changing conditions for the heat treatment.

Since, in the method according to the present invention, the nanoparticles are subjected to the heat treatment with the nanoparticles being maintained in the gas phase in the dispersed state, the difference in the mode of crystallization among the nanoparticles is small. The productivity of the method of producing the ferroelectric metal oxide crystalline particles is thus very high, as compared with that of a method in which particles forming a thin film are subjected to a heat treatment.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
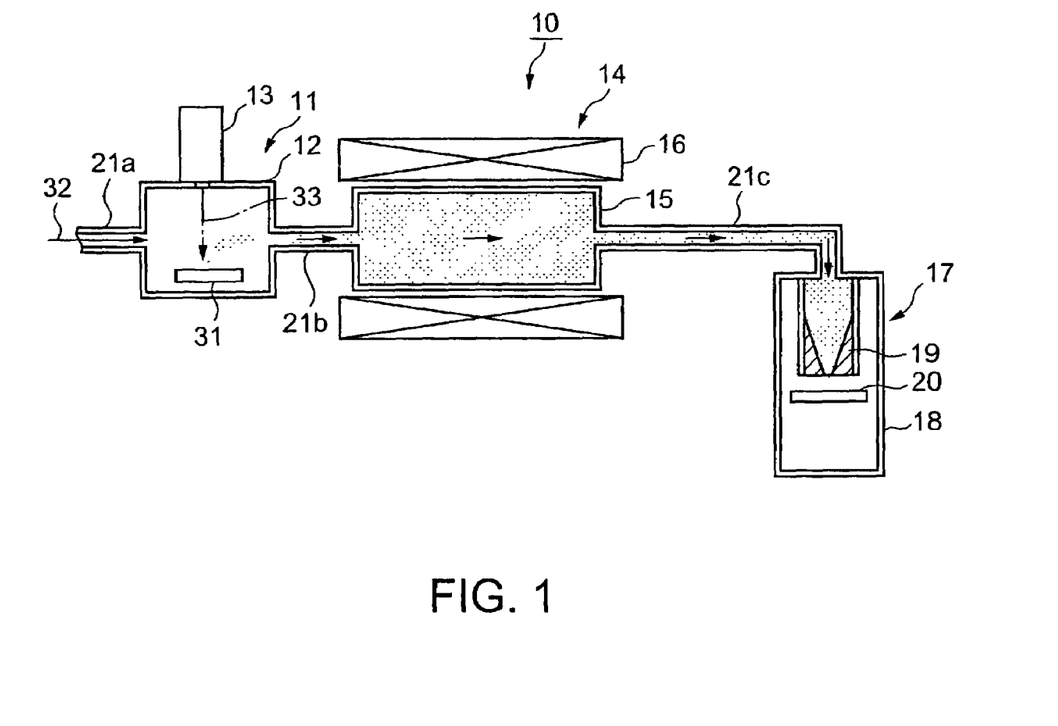
FIG. 1 is a schematic sectional view of an apparatus for carrying out a method of producing ferroelectric metal oxide crystalline particles in a preferred embodiment of the present invention.

Referring to FIG. 1 showing an apparatus 10 for carrying out a method of producing ferroelectric metal oxide crystalline particles in a preferred embodiment according to the present invention, the apparatus 10 includes a particle producing device 11, a heat treatment device 14 and a particle collecting device 17. The particle producing device 11 produces nanoparticles of a ferroelectric metal oxide and disperses the nanoparticles in an oxygen atmosphere (gas phase). The heat treatment device 14 processes the nanoparticles dispersed in the oxygen atmosphere by a heat treatment. The particle collecting device 17 collects the heat-treated nanoparticles.

The particle producing device 11 is provided with a vessel 12, a laser device 13 for irradiating a particle source 31 of a ferroelectric metal oxide placed in the vessel 12 with a laser beam 33. Nanoparticles of particle sizes in the range of 1 to 100 nm can be produced from the particle source 31 by a laser ablation method. Preferably, the crystals of the ferroelectric metal oxide have a perovskite structure. More concretely, the ferroelectric metal oxide may be a ferroelectric metal oxide of simple a perovskite structure or a complex perovskite structure, such as $PbTiO_3$, $BaTiO_3$ or $Pb(Zr_{1-x}Ti_x)O_3$ or may be a ferroelectric bismuth oxide having a layered structure (pseudoperovskite structure), such as $SrBi_2Ta_2O_9$, $Bi_4Ti_3O_{12}$ or $SrBi_2Nb_2O_9$.

A carrier gas 32 is supplied through a carrier gas supply pipe 21a into the vessel 12 of the particle producing device 11. Nanoparticles produced in the vessel 12 is dispersed in the carrier gas 32, and the carrier gas 32 carrying the nanoparticles is supplied through a connecting pipe 21b into the heat treatment device 14. Preferably, the carrier gas 32 to be supplied into the vessel 12 of the particle producing device 11 is oxygen gas or a mixed gas prepared by mixing oxygen gas and other gases. Preferably, the interior space of the vessel 12 is maintained at a desired reduced pressure according to the amount of the nanoparticles in order to inhibit the cohesion of the nanoparticles effectively.

The heat treatment device 14 is provided with a vessel 15, and an electric heater 16 surrounding the vessel 15. The heat treatment device 14 heats the nanoparticles carried in a dispersed state by the carrier gas 32 at a predetermined temperature for a predetermined time for a heat treatment. The nanoparticles are carried by the carrier gas 32 through the connecting pipe 21b from the vessel 12 of the particle producing device 11 into the vessel 15 in an oxygen atmosphere (gas phase). The "dispersed state" signifies the so-called aerosol state where particles are suspended against gravity and float in the oxygen atmosphere (gas phase). The dispersed state can be created by properly controlling the flow and velocity of the carrier gas 32 on the basis of particle sizes and specific gravities of the nanoparticles.

The temperature and the time for the heat treatment in the vessel 15 of the heat treatment device 14 are selectively determined according to the particle sizes and the material of the nanoparticles. The electric heater 16 is controlled to maintain the temperature for the heat treatment. The length of the vessel 15 is selectively determined and the flow and the pressure of the carrier gas 32 supplied into the vessel 15 are selectively determined to heat-treat the nanoparticles for the predetermined time. Preferably, the interior space of the vessel 15 is maintained at a desired reduced pressure according to the nanoparticle producing rate and such in order to inhibit the cohesion of the nanoparticles effectively.

The particle collecting device 17 is provided with a vessel 18 and a particle collector 19 adapted to collect the nanoparticles supplied thereto together with the carrier gas 32 from the vessel 15 of the heat treatment device 14 through a connecting pipe 21c. The nanoparticles heat-treated by the heat treatment device 14 are collected on a collecting plate 20 placed in the vessel 18.

The operation of the apparatus 10 for carrying out the method of producing the ferroelectric metal oxide crystalline particles in the preferred embodiment will be described. The laser device 13 irradiates the particle source 31 placed in the vessel 12 with the laser beam 33 to produce the nanoparticles from the particle source 31 by a laser ablation method. The carrier gas 32 is supplied through the supply pipe 21a into the vessel 12 of the particle producing device 11. The nanoparticles produced in the vessel 12 are dispersed and suspended in the carrier gas 32. The dispersed nanoparticles are supplied together with the carrier gas 32 through the connecting pipe 32b into the vessel 15 of the heat treatment device 14. While the nanoparticles thus dispersed in the oxygen atmosphere (gas phase) are flowing together with the carrier gas 32 through the vessel 15, the heater 16 heats the nanoparticles at the predetermined temperature for the predetermined time for the heat treatment. Subsequently, the nanoparticles thus heat-treated in the vessel 15 of the heat treatment device 14 are supplied together with the carrier gas 32 through the connecting pipe 21c into the vessel 18 of the particle collecting device 17. The particle collector 19 collects the nanoparticles on the collecting plate 20. Thus, the nanoparticles of the ferroelectric metal oxide having the predetermined crystal form and crystallinity are collected on the collecting plate 20.

In the method according to the above-mentioned embodiment of the present invention, the nanoparticles of the ferroelectric metal oxide are produced and dispersed in the carrier gas 32 by the particle producing device 11; and the nanoparticles are heat-treated with the nanoparticles being maintained in the oxygen atmosphere (gas phase) in the dispersed state by the heat treatment device 14. Therefore, the growth of the nanoparticles during the heat treatment can be inhibited even if the nanoparticles are heat-treated at a high temperature, so that the particle sizes of the nanoparticles as produced can be maintained. Thus, the method according to this embodiment is able to easily produce high-purity, high-crystallinity nanoparticles of a ferroelectric metal oxide.

The method in this embodiment is able to easily control the particle sizes of the end nanoparticles of the ferroelectric metal oxide by changing the nanoparticle producing method and and the particle producing conditions employed in the particle producing device 11. The particle sizes, crystal form and crystallinity of the end nanoparticles of the ferroelectric metal oxide can be easily controlled by changing the conditions for the heat treatment to be carried out by the heat treatment device 14.

Since, in the method in this embodiment, the nanoparticles are subjected to the heat treatment with the nanoparticles being maintained in the oxygen atmosphere in the dispersed state, the respective crystallinities of the nanoparticles are distributed in a narrow range. The productivity of the method of producing the ferroelectric metal oxide crystalline particles in this embodiment is thus very high, as compared with that of a method in which particles forming a thin film are subjected to the heat treatment.

Although the particle producing device 11 that produces nanoparticles by means of a laser ablation method is employed in this embodiment, a particle producing device that produces nanoparticles by means of some other method, such as a sputtering method, a CVD method, a coprecipitation method or an electrospraying method, may be employed in the method of producing ferroelectric metal oxide crystalline particles. Although the heat treatment device 14 employed by this embodiment is an electric furnace provided with an electric heater, any suitable heat treatment device, such as a heating device provided with infrared lamps, may be used.

EXAMPLES

Examples of the method of producing ferroelectric metal oxide crystalline particles in this embodiment will be described hereinafter.

Example 1

Firstly, the embodiment, in which a ceramic bar of PZT ($Pb_{1.0}Zr_{0.52}Ti_{0.48}O_3$) is employed as a particle source, will be described.

The vessel of the particle producing device was evacuated; and oxygen gas was supplied into the vessel to create an oxygen atmosphere having a reduced pressure of about 3 torr in the vessel. A ceramic bar of PZT ($Pb_{1.0}Zr_{0.52}Ti_{0.48}O_3$) as a particle source placed in the vessel was irradiated with a laser beam, having a wavelength identical to that of the second harmonic or the third harmonic of a YAG laser, emitted by an Nd-YAG laser to produce nanoparticles from the ceramic bar by a laser ablation method. Oxygen gas, as a carrier gas, was supplied at a flow rate of 300 sccm into the vessel of the particle producing device, so that the nanoparticles produced in the vessel were supplied into the vessel of the heat treatment device together with the oxygen gas. The nanoparticles were maintained in the oxygen gas in the dispersed state.

The nanoparticles flowing through the vessel of the heat treatment device together with the oxygen gas were subjected to a heat treatment at different temperatures, namely, 600° C., 900° C. and 1000° C.

The nanoparticles heat-treated in the vessel of the heat treatment device were supplied together with the oxygen gas into the vessel of the particle collecting device. The nanoparticles heat-treated at different temperatures by the heat treatment device were collected separately on carbon films, respectively, for observation with a transmission electron microscope (TEM). Thus, the high-crystallinity ferroelectric PZT nanoparticles of a perovskite structure having particle sizes of about 9 nm were collected on the carbon films.

Figure 2:
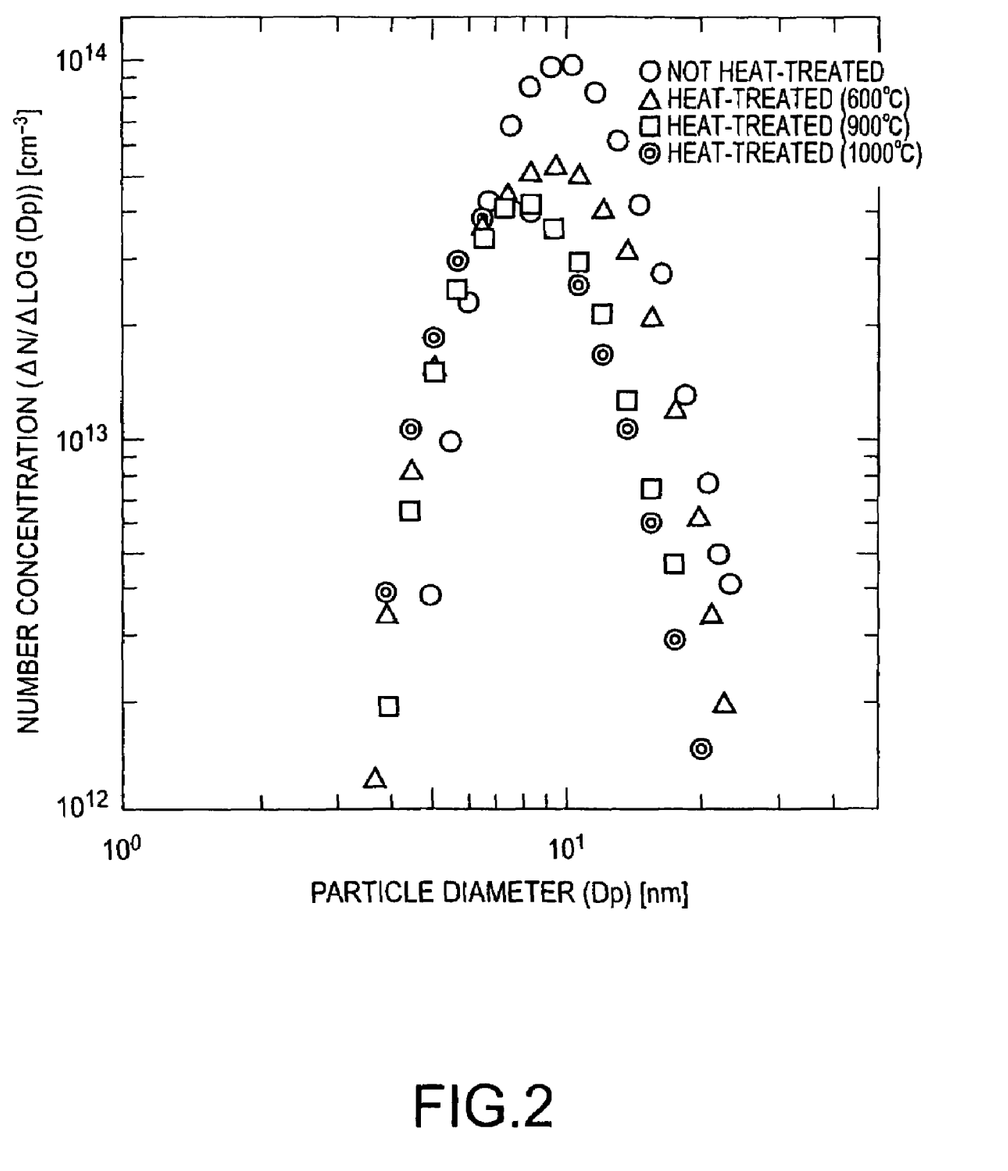
FIG. 2 is a graph comparatively showing the particle size distributions of $Pb_{1.0}Zr_{0.52}Ti_{0.48}O_3$ (abbreviated to "PZT") nanoparticles heat-treated at different temperatures and the particle size distribution of PZT nanoparticles not processed by any heat treatment.

FIG. 2 shows the particle size distributions of the PZT nanoparticles heat-treated at 600° C., 900° C. and 1000° C., respectively, in comparison with the particle size distribution of the PZT nanoparticles not processed by the heat treatment. The particle size distributions were measured by a differential mobility analyzer (DMA).

As obvious from FIG. 2, the particle sizes of all the PZT nanoparticles including those heat-treated at different temperatures and those not processed by the heat treatment distributed substantially in the same range of 4 to 20 nm, regardless of heat treatment and temperatures for heat treatment. It is known from FIG. 2 that the growth of the PZT nanoparticles during heat treatment is inhibited even in the heat treatment that heats the PZT nanoparticles at a high temperature.

Figure 3:
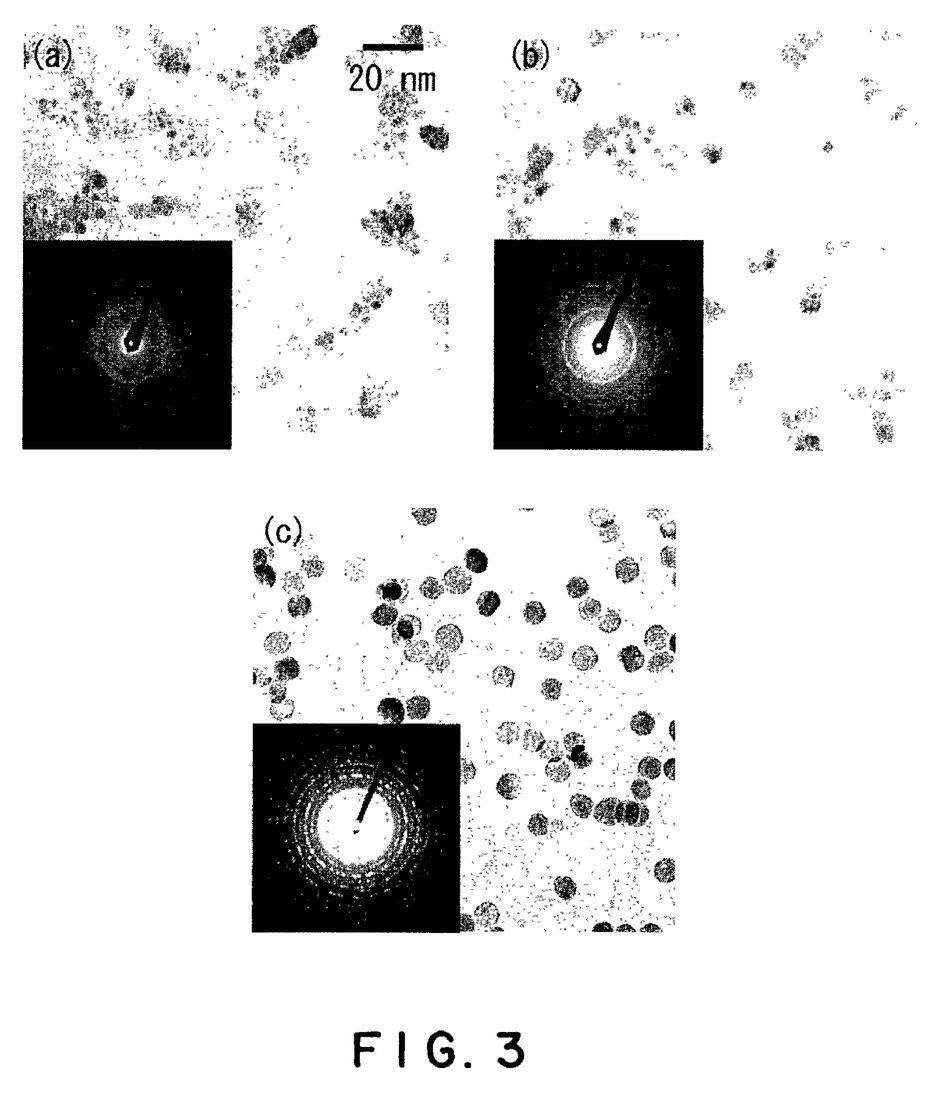
FIG. 3 shows photomicrographs including TEM (transmission electron microscope) images of the crystal structures of PZT nanoparticles, and SAD (selected area electron diffraction) patterns shown in the insets of the corresponding TEM images.

FIGS. 3(a), 3(b) and 3(c) are photomicrographs of the PZT nanoparticles (having the particle sizes of about 9 nm) collected on the carbon films, which are taken by using a high-resolution transmission electron microscope (TEM). It is noted that the insets of the TEM images show the SAD (selected area electron diffraction) patterns of the corresponding TEM images.

FIG. 3(a) shows the crystal structure of the PZT nanoparticles not processed by any heat treatment (the inset of FIG. 3(a) shows the corresponding SAD pattern). FIGS. 3(b)(c) respectively show the crystal structures of the PZT nanoparticles heat-treated at different temperatures (600° C. and 900° C.) (the insets of FIGS. 3(b)(c) respectively show the corresponding SAD patterns).

As obvious from the TEM image of FIG. 3(a), the PZT nanoparticles not processed by the heat have an irregular shape. Any diffraction rings or dots are not seen in the SAD pattern of the PZT nanoparticles (seethe inset of FIG. 3(a)); and it is known that the PZT nanoparticles are amorphous.

It is known from the TEM image of FIG. 3(b) that the PZT nanoparticles heat-treated at 600° C. have a near-spherical shape. Diffraction rings originating from the crystalline phase are seen in the SAD pattern of the PZT nanoparticles (see the inset of FIG. 3(b)). It indicates that the PZT nanoparticles have a crystal structure. It is known from the electron diffraction rings that the calculated plane distances of the crystal structure are in coincidence with those of PZT pyrochlore. It indicates that the PZT nanoparticles heat-treated at 600° C. have a pyrochlore structure.

As obvious from the TEM image of FIG. 3(c), the PZT nanoparticles heat-treated at 900° C. have a spherical shape. Diffraction rings originating from the perovskite crystalline phase are seen in the SAD pattern of the PZT nanoparticles (see the inset of FIG. 3(c)); it indicates that the PZT nanoparticles heat-treated at 900° C. have a perovskite structure.

Although not shown in the drawings, the crystalline structure of PZT nanoparticles heat-treated at 1000° C. are different from both of the PZT nanoparticles heat-treated at 600° C. and 900° C., and were found to be close to the pyrochlore, but not exactly pyrochlore.

It was found from the measured results that PZT nanoparticles having a perovskite structure could be obtained by subjecting the PZT nanoparticles produced by the laser ablation method to a heat treatment at a high temperature, such as around or no less than 900° C.

Figure 4:
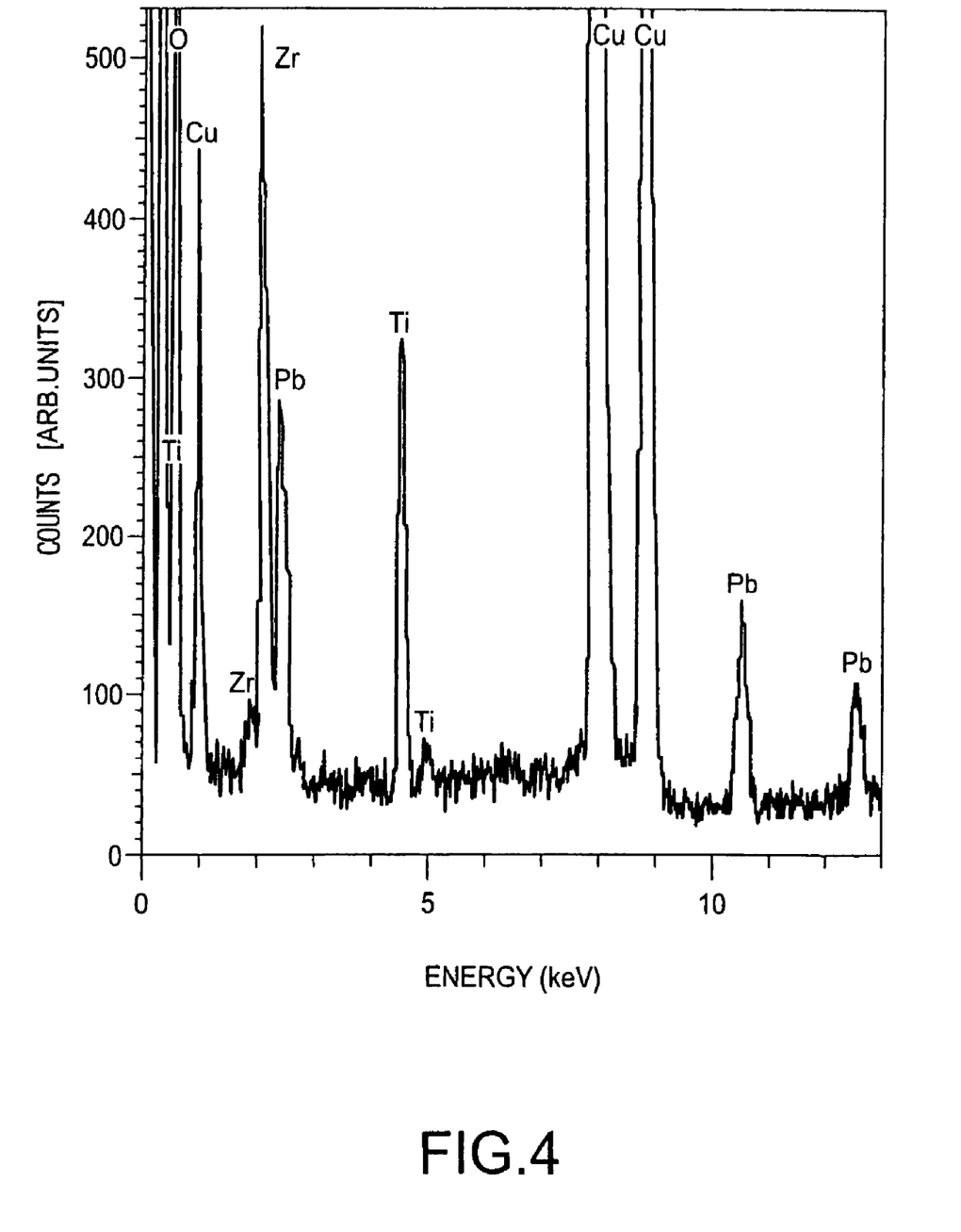
FIG. 4 is a spectrum representing the composition of PZT nanoparticles processed by a heat treatment.

FIG. 4 is a spectrum representing the composition of the PZT nanoparticles processed by the heat treatment at 900° C. The spectrum was obtained by measurement using an energy dispersive x-ray spectroscopy.

The spectrum showing the composition of the PZT nanoparticles has peaks for Pb, Zr, Ti and O. An atomic ratio calculated from the peaks is Pb:Zr:Ti=0.9:0.51:0.49; and this ratio is in well coincidence with the composition of the ceramic bar for particle production. In FIG. 4, peaks for Cu indicate Cu contained in a microgrid used for collecting the PZT nanoparticles. It is known from FIG. 4 that the impurity content of the PZT nanoparticles is infinitesimal.

Example 2

Next, the embodiment, in which a ceramic bar of SBT ($SrBiTa_2O_9$) is employed as a particle source, will be described.

The vessel of the particle producing device was evacuated; and oxygen gas was supplied into the vessel to create an oxygen atmosphere having a reduced pressure of about 2 torr in the vessel. A ceramic bar of SBT ($SrBiTa_2O_9$) as a particle source placed in the vessel was irradiated with a laser beam emitted by an Nd-YAG laser to produce nanoparticles from the ceramic bar by a laser ablation method. Oxygen gas, as a carrier gas, was supplied at a flow rate of 300 sccm into the vessel of the particle producing device, so that the nanoparticles produced in the vessel were supplied into the vessel of the heat treatment device together with the oxygen gas. The nanoparticles were maintained in the oxygen gas in the dispersed state.

The nanoparticles flowing through the vessel of the heat treatment device together with the oxygen gas were subjected to a heat treatment at different temperatures, namely, 300° C., 600° C. and 800° C.

The nanoparticles heat-treated in the vessel of the heat treatment device were supplied together with the oxygen gas into the vessel of the particle collecting device. The nanoparticles heat-treated at different temperatures by the heat treatment device were collected separately on carbon films, respectively, for observation with a transmission electron microscope (TEM). Thus, the high-crystallinity ferroelectric SBT nanoparticles of a perovskite structure having particle sizes of about 7 nm were collected on the carbon films.

Figure 5:
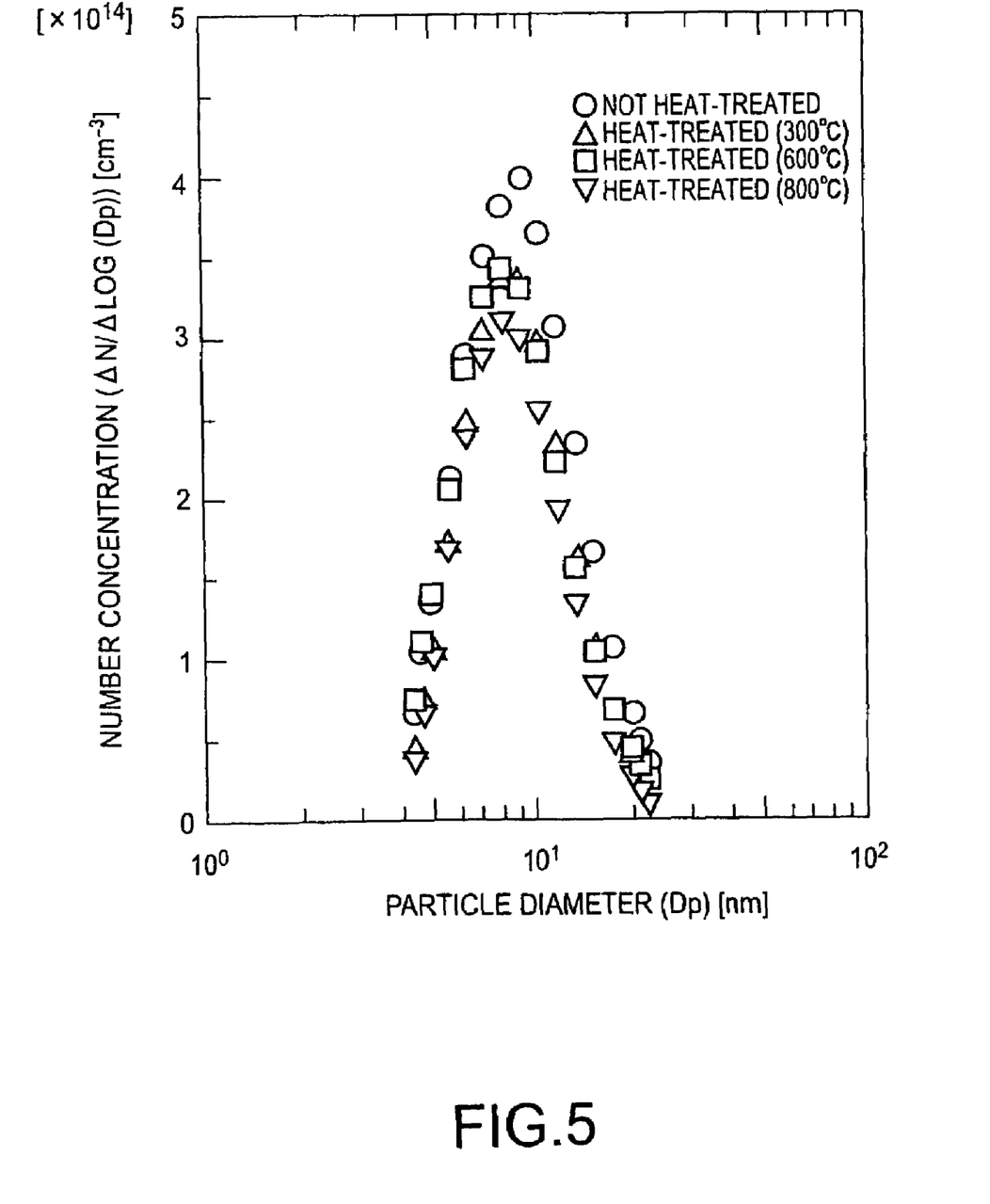
FIG. 5 is a graph comparatively showing the particle size distributions of SBT nanoparticles heat-treated at different temperatures and the particle size distribution of SBT nanoparticles not processed by any heat treatment.

FIG. 5 shows the particle size distributions of the SBT nanoparticles heat-treated at 300° C., 600° C. and 800° C., respectively, in comparison with the particle size distribution of the SBT nanoparticles not processed by the heat treatment. The particle size distributions were measured by a differential mobility analyzer (DMA).

As obvious from FIG. 5, the particle sizes of all the SBT nanoparticles including those heat-treated at different temperatures and those not processed by the heat treatment are distributed substantially in the same range of 4 to 20 nm, regardless of heat treatment and temperatures for the heat treatment. It is known from FIG. 5 that the growth of the SBT nanoparticles during the heat treatment is inhibited even in the heat treatment that heats the SBT nanoparticles at a high temperature.

Figure 6:
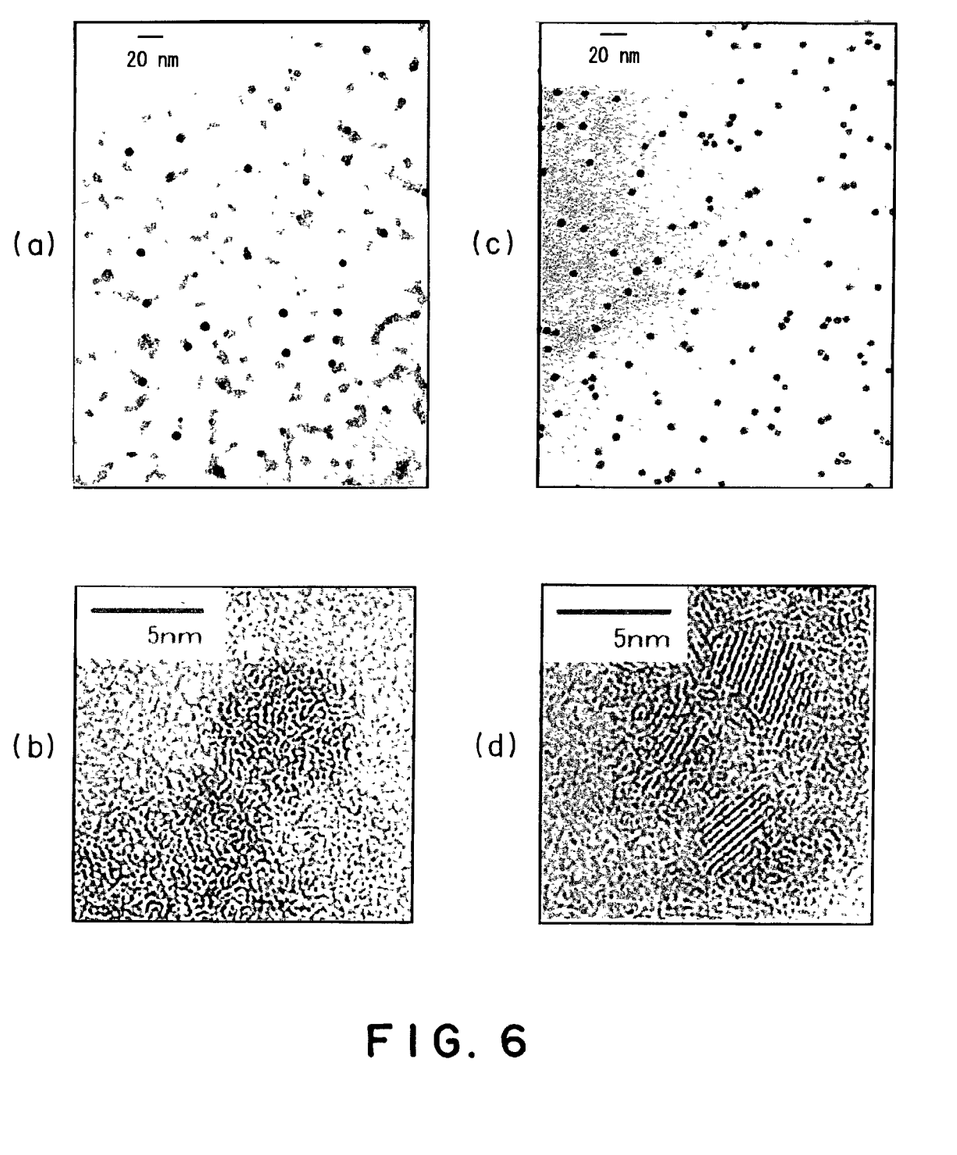
FIG. 6 shows photomicrographs including TEM images of the crystal structures of SBT nanoparticles.

FIGS. 6($a$), 6($b$), 6($c$) and 6($d$) are photomicrographs of the SBT nanoparticles (having the particle sizes of about 7 nm) collected on the carbon films, which are taken by using a high-resolution transmission electron microscope (TEM) having magnifications up to 4,000,000 power. FIGS. 6($a$) and 3($b$) are the TEM images at ×200,000 and ×4,000,000 magnifications, which show the crystal structure of the SBT nanoparticles not processed by any heat treatment. FIGS. 6($c$) and 3($d$) are the TEM images at ×200,000 and ×4,000,000 magnifications, which show the crystal structure of the SBT nanoparticles heat-treated at 800° C.

As obvious from FIG. 6($a$), the SBT nanoparticles not processed by the heat treatment includes spherical ones and flat ones. Any crystal lattice is not seen in the photomicrograph of a greater magnification of ×4,000,000 shown in FIG. 6($b$); and it is known that the SBT nanoparticles are amorphous.

It is known from the photomicrograph of ×200,000 magnification shown in FIG. 6($c$) that all the SBT nanoparticles heat-treated at 800° C. are spherical. As obvious from the photomicrograph of ×4,000,000 magnification shown in FIG. 6($d$) of the same SBT nanoparticles, the SBT nanoparticles have a crystal structure having lattice spacing of 0.27 nm.

Although not shown in the drawings, the SBT nanoparticles heat-treated at 300° C. and 600° C., respectively, similarly to the SBT nanoparticles not processed by the heat treatment, were amorphous.

It was found from the measured results that high-crystallinity SBT nanoparticles can be obtained by subjecting the SBT nanoparticles produced by the laser ablation method to a heat treatment at a high temperature, such as 800° C.

Figure 7:
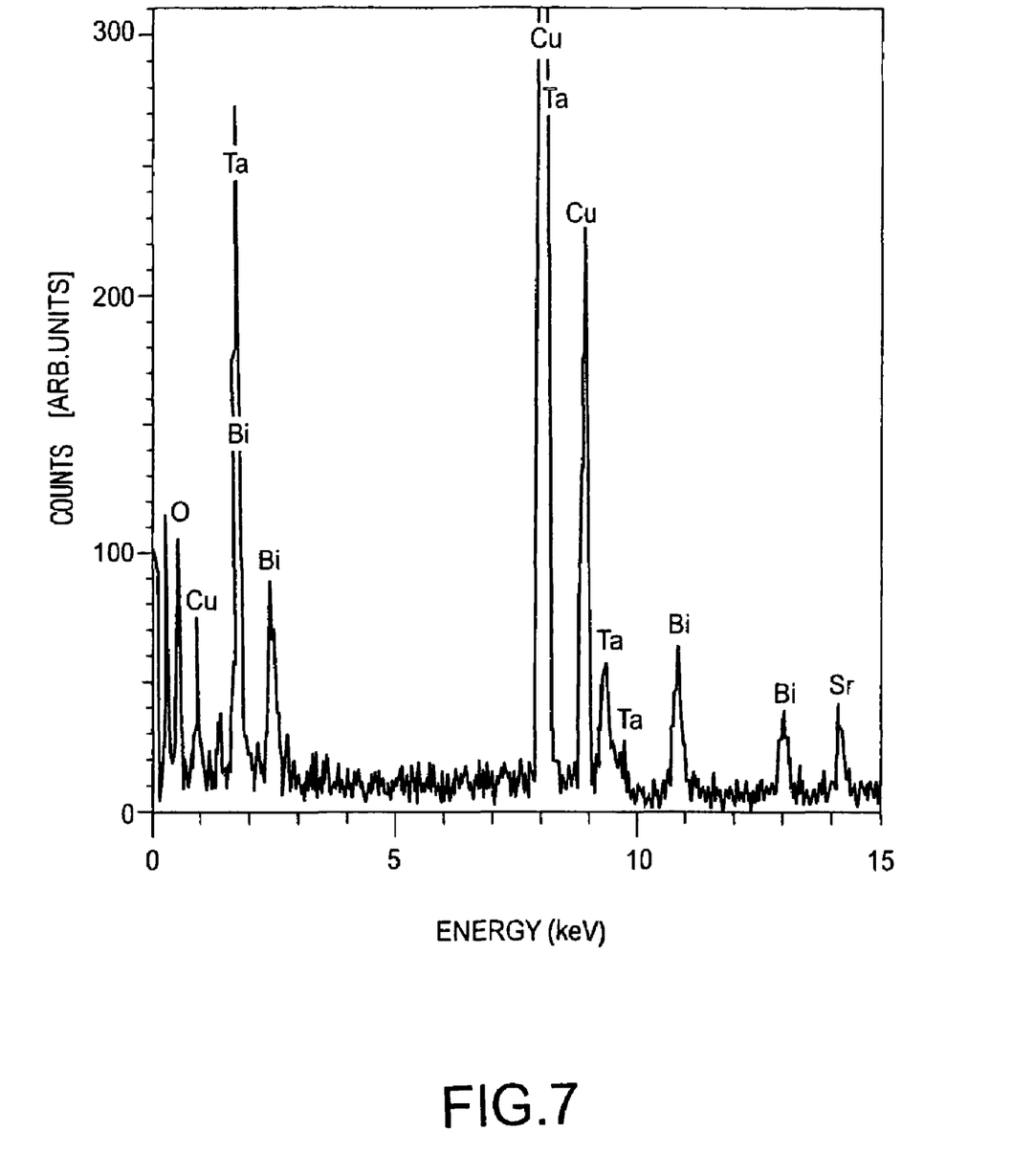
FIG. 7 is a spectrum representing the composition of SBT nanoparticles processed by a heat treatment.

FIG. 7 is a spectrum representing the composition of the SBT nanoparticles processed by the heat treatment at 800° C. The spectrum was obtained by measurement using an energy dispersive x-ray spectroscopy like the above-mentioned Example 1.

The spectrum showing the composition of the SBT nanoparticles has peaks for Sr, Bi, Ta and O. In FIG. 7, peaks for Cu indicate Cu contained in a microgrid used for collecting the SBT nanoparticles. It is known from FIG. 7 that the impurity content of the SBT nanoparticles is small.

What is claimed is:

1. A method of producing ferroelectric metal oxide crystalline particles, comprising:
    a first step of producing nanoparticles of a ferroelectric metal oxide and dispersing the nanoparticles in a gas phase, the nanoparticles being produced by laser ablation; and
    a second step of processing the nanoparticles by a heat treatment with the nanoparticles being maintained in the gas phase in a dispersed state.

2. The method according to claim 1, wherein the nanoparticles produced in said first step comprise a ferroelectric metal oxide that takes a perovskite structure as a crystal structure.

3. The method according to claim 2, wherein the ferroelectric metal oxide is selected from the group consisting of $PbTiO_3$, $BaTiO_3$ and $Pb(Zr_{1-x}Ti_x)O_3$.

4. The method according to claim 2, wherein the ferroelectric metal oxide is selected from the group consisting of $SrBi_2Ta_2O_9$, $Bi_4Ti_3O_{12}$ and $SrBi_2Nb_2O_9$.

5. The method according to claim 1, wherein the particle sizes of the nanoparticles produced in said first step are in a range of 1 to 100 nm.

6. The method according to claim 1, wherein, in said second step, conditions for the heat treatment are changed so as to control a particle size, crystal form and crystallinity of ferroelectric metal oxide crystalline particles to be produced.

7. The method according to claim 1, wherein the gas phase used in said first and second steps is an atmosphere of oxygen gas.

8. The method according to claim 1, wherein the gas phase used in said first and second steps is an atmosphere of a mixed gas of oxygen and another gas.

9. A method of producing ferroelectric metal oxide crystalline particles, comprising:

a first step of producing nanoparticles of a ferroelectric metal oxide and dispersing the nanoparticles in a gas phase, the ferroelectric metal oxide having a perovskite crystal structure and being selected from the group consisting of $SrBi_2Ta_2O_9$, $Bi_4Ti_3O_{12}$ and $SrBi_2Nb_2O_9$; and a second step of processing the nanoparticles by a heat treatment with the nanoparticles being maintained in the gas phase in a dispersed state.

10. The method according to claim 9, wherein the particle sizes of the nanoparticles produced in said first step are in a range of 1 to 100 nm.

11. The method according to claim 9, wherein, in said second step, conditions for the heat treatment are changed so as to control a particle size, crystal form and crystallinity of ferroelectric metal oxide crystalline particles to be produced.

12. The method according to claim 9, wherein the gas phase used in said first and second steps is an atmosphere of oxygen gas.

13. The method according to claim 9, wherein the gas phase used in said first and second steps is an atmosphere of a mixed gas of oxygen and another gas.

* * * * *